(12) United States Patent
Egawa

(10) Patent No.: US 8,013,914 B2
(45) Date of Patent: Sep. 6, 2011

(54) IMAGING APPARATUS INCLUDING NOISE SUPPRESSION CIRCUIT

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 770 days.

(21) Appl. No.: 12/056,761

(22) Filed: Mar. 27, 2008

(65) Prior Publication Data
US 2008/0239121 A1 Oct. 2, 2008

(30) Foreign Application Priority Data
Mar. 30, 2007 (JP) ................................. 2007-091655

(51) Int. Cl.
*H04N 5/217* (2011.01)
*H04N 3/14* (2006.01)

(52) U.S. Cl. ........................................ 348/241; 348/280

(58) Field of Classification Search .................... 348/241
See application file for complete search history.

(56) References Cited

U.S. PATENT DOCUMENTS

| | | | |
|---|---|---|---|
| 6,882,754 B2 | 4/2005 | Hayashi | |
| 6,996,289 B1 * | 2/2006 | Tsutamori et al. | 382/275 |
| 7,050,651 B2 | 5/2006 | Zaklika et al. | |
| 7,092,018 B1 * | 8/2006 | Watanabe | 348/247 |
| 7,095,439 B2 * | 8/2006 | Hammadou | 348/308 |
| 7,167,595 B2 * | 1/2007 | Hiroshige et al. | 382/266 |
| 7,391,920 B2 * | 6/2008 | Abe | 382/266 |
| 7,667,748 B2 * | 2/2010 | Kono | 348/246 |
| 2003/0151682 A1 * | 8/2003 | Kokubo et al. | 348/241 |
| 2004/0246350 A1 * | 12/2004 | Sakamoto | 348/241 |
| 2005/0270388 A1 * | 12/2005 | Hamamoto | 348/242 |
| 2007/0127836 A1 | 6/2007 | Subbotin | |

FOREIGN PATENT DOCUMENTS

| | | |
|---|---|---|
| JP | 4-235472 | 8/1992 |
| JP | 2000-331152 | 11/2000 |
| JP | 2002-10108 | 1/2002 |
| JP | 2005-303731 | 10/2005 |

* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

There is an imaging apparatus including a noise suppression circuit. The noise suppression circuit includes sorting of one signal of a central pixel and four signals of peripheral pixels having the same color which are close to the central pixel in the image signals in order of magnitude, calculating of an average value from the one signal of the central pixel and the four signals of the peripheral pixels, calculating of a difference value from a maximum value and a minimum value of the one signal of the central pixel and the four signals of the peripheral pixels, comparing of the difference value with an assumed noise level, and substituting of the one signal of the central pixel by an average value of two or more pixel values excluding the maximum or minimum values when the first difference value is larger than the noise level.

15 Claims, 10 Drawing Sheets

Bayer arrangement
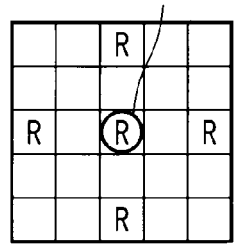
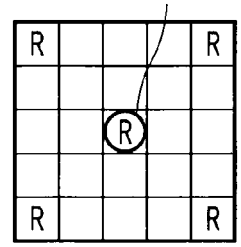
FIG. 10A          FIG. 10B          FIG. 10C
Inclined (honeycomb) arrangement
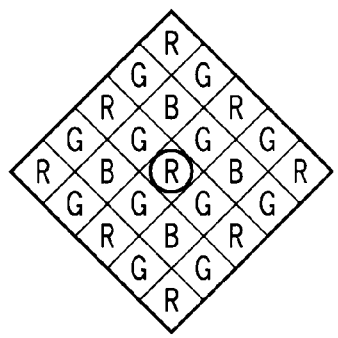
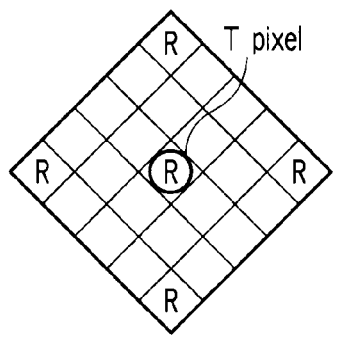
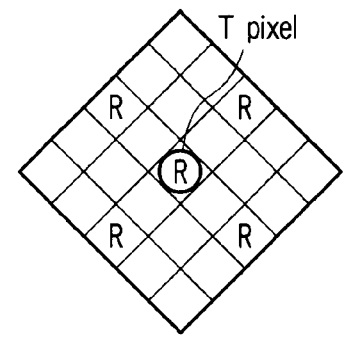
FIG. 11A          FIG. 11B          FIG. 11C

IMAGING APPARATUS INCLUDING NOISE SUPPRESSION CIRCUIT

CROSS-REFERENCE TO RELATED APPLICATIONS

This application is based upon and claims the benefit of priority from prior Japanese Patent Application No. 2007-091655, filed Mar. 30, 2007, the entire contents of which are incorporated herein by reference.

BACKGROUND OF THE INVENTION

1. Field of the Invention

The present invention relates to an imaging apparatus. More particularly, the present invention relates to an imaging apparatus such as a complementary metal oxide semiconductor (CMOS) image sensor which is used in, e.g., a camera-equipped mobile phone, a digital camera, or a video camera.

2. Description of the Related Art

In an imaging apparatus, a random noise suppressing method using a median filtering processing has been conventionally proposed (see, e.g., Jpn. Pat. Appln. KOKAI Publication No. 4-235472). In this proposed medial filtering processing, a signal of a central pixel in a 3×3 pixel region is substituted by a median (signal which is a fifth signal counted from the highest or lowest level) obtained by sorting signals in the 3×3 pixel region in order of level magnitude. Therefore, there is a problem that a resolution at an edge portion of an image is degraded or a sufficient random noise suppressing effect cannot be obtained when random noise of an imaging system is large. In order to enable sufficient suppression of the random noise, a pixel region must be increased, and a circuit scale thereby becomes large.

Further, there has been proposed a method of judging a level difference between an average value of signals of pixels around a central pixel and a signal of the central pixel and substituting the signal of the central pixel in accordance with a result of this judgment (see, e.g., Jpn. Pat. Appln. KOKAI Publication No. 2002-10108). According to this method, when the level difference is smaller than a set threshold value, noise is recognized, and the signal of the central pixel is substituted by the average value of the signals of the peripheral pixels. Conversely, when the level difference is larger than the threshold value, the signal of the central pixel is not substituted (used as it is). However, according to this method, when a defect is produced in one given pixel, noise due to this defect cannot be suppressed. When suppressing the noise due to the defect, another dedicated circuit is required, resulting in a problem of an increase in a circuit scale.

Furthermore, a random noise suppressing method of detecting edge information of an image and performing median filtering processing has been proposed (see, e.g., Jpn. Pat. Appln. KOKAI Publication No. 2005-303731). However, in case of this proposal, four difference circuits are required to extract an edge. Further, there is also a problem that random noise cannot be suppressed when an edge is determined. Moreover, as with the above-explained proposal, since a signal of a central pixel is substituted by a median, random noise cannot be sufficiently suppressed.

BRIEF SUMMARY OF THE INVENTION

According to a first aspect of the present invention, there is provided an imaging apparatus in which a noise suppression circuit performs predetermined signal processing with respect to image signals output from an imaging section where a plurality of pixels formed of photoelectric conversion elements are two-dimensionally arranged and a color filter arrangement has a cross of five pixels of a same color, wherein the noise suppression circuit includes:

sorting processing of sorting one signal of a central pixel as a target and four signals of peripheral pixels having the same color which are close to the central pixel in the image signals in order of magnitude;

average value calculation processing of calculating a first average value from the one signal of the central pixel and the four signals of the peripheral pixels;

difference value calculation processing of calculating a first difference value from a maximum value and a minimum value of the one signal of the central pixel and the four signals of the peripheral pixels sorted in order of magnitude;

comparison processing of comparing the first difference value with an assumed noise level; and substitution processing of substituting the one signal of the central pixel by an average value of two or more pixel values excluding at least the maximum value or the minimum value when the first difference value is larger than the noise level.

According to a second aspect of the present invention, there is provided an imaging apparatus comprising: an imaging section in which a plurality of pixels formed of photoelectric conversion elements are two-dimensionally arranged and a color filter arrangement has a cross of five pixels of a same color; and a noise suppression circuit which performs predetermined signal processing with respect to image signals respectively output from the imaging section, wherein the noise suppression circuit includes:

sorting processing of sorting one signal of a central pixel as a target and four signals of peripheral pixels having the same color which are close to the central pixel in crossing directions or X-shaped directions in the image signals in order of magnitude;

difference value calculation processing of calculating a first difference value from a maximum value and a minimum value of the one signal of the central pixel and the four signals of the peripheral pixels sorted in order of magnitude;

average value calculation processing of calculating a first average value from the one signal of the central pixel and the four signals of the peripheral pixels;

comparison processing of comparing the first difference value with an assumed noise level; and substitution processing of substituting the one signal of the central pixel by an average value of two or more pixel values excluding at least the maximum value or the minimum value when the first difference value is larger than the noise level.

BRIEF DESCRIPTION OF THE SEVERAL VIEWS OF THE DRAWING

FIGS. 10A to 10C are views showing color filter arrangements while taking a Bayer arrangement as an example; and FIGS. 11A to 11C are views showing color filter arrangements while taking a honeycomb arrangement as an example.

DETAILED DESCRIPTION OF THE INVENTION

Embodiments of the present invention will be described with reference to the accompanying drawings. It should be noted that the drawings are schematic ones and the dimension ratios shown therein are different from the actual ones. The dimensions vary from drawing to drawing and so do the ratios of dimensions. The following embodiments are directed to a device and a method for embodying the technical concept of the present invention and the technical concept does not specify the material, shape, structure or configuration of components of the present invention. Various changes and modifications can be made to the technical concept without departing from the scope of the claimed invention.

First Embodiment

Figure 1:
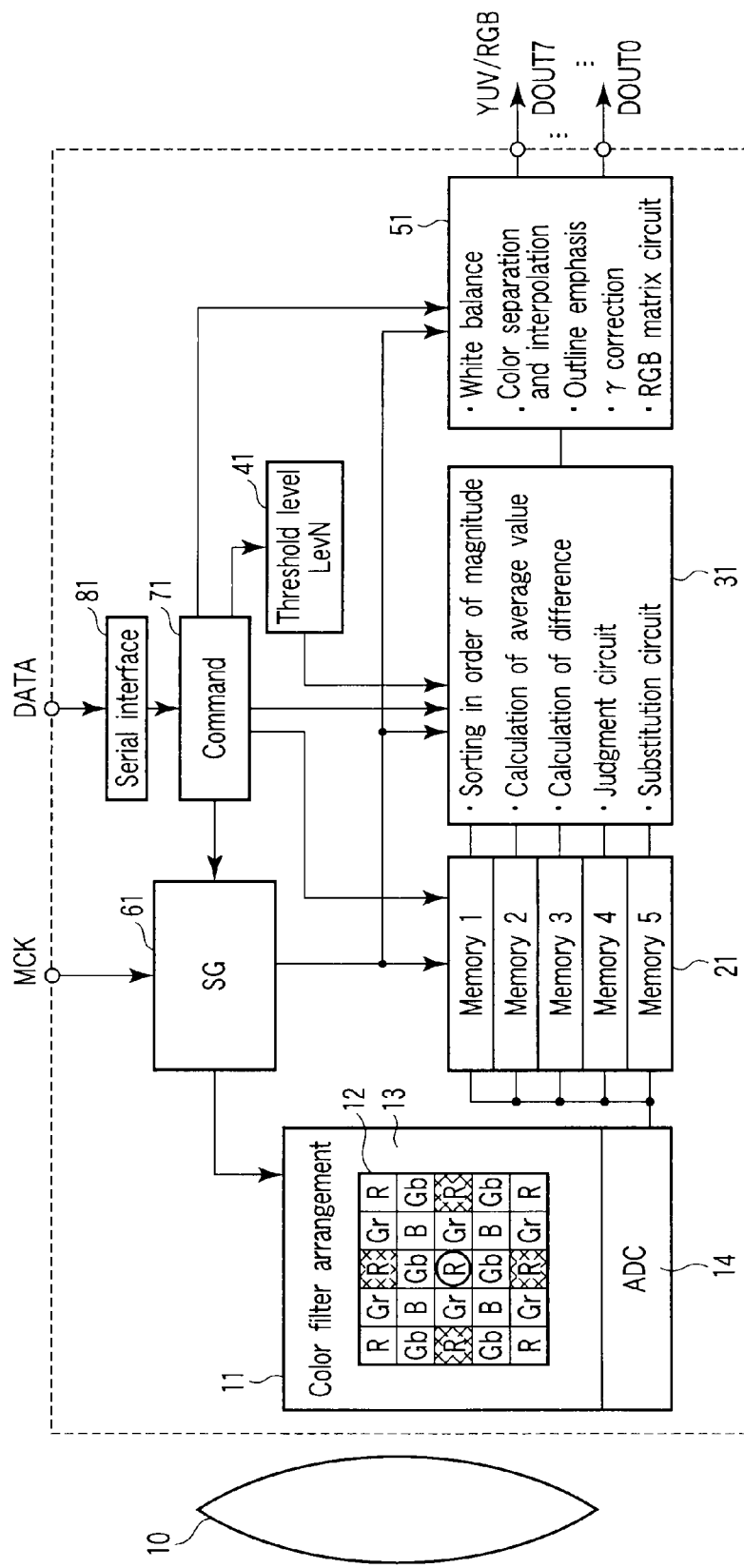
FIG. 1 is a block diagram showing a structural example of an imaging apparatus (CMOS image sensor) according to a first embodiment of the present invention.

FIG. 1 shows a structural example of an imaging apparatus according to a first embodiment of the present invention. It is to be noted that an example of a CMOS image sensor will be explained in this embodiment.

In FIG. 1, a sensor section 11 has a color filter 12, a photodiode array (imaging section) 13 in which a plurality of pixels (photoelectric conversion elements) are two-dimensionally arranged, and a columnar analog-to-digital converter (ADC) 14. The color filter 12 separates a light signal condensed by a lens (imaging system) into RGB signals to be image-formed on the photodiode array 13. The photodiode array 13 converts the image-formed RGB signals into signal charges in accordance with each pixel to be supplied to the ADC 14. The ADC 14 converts the received signal charge of each pixel into a digital signal (image signal), and outputs the converted digital signal to a line memory 21. It is to be noted that a Bayer arrangement (tetragonal arrangement) of RGB elementary colors is taken as an example for a color filter arrangement of the color filter 12.

The line memory 21 has, e.g., memories 1 to 5 corresponding to five lines in a vertical direction, and these memories store output signals from the sensor section 11 (image signals from the ADC 14), respectively. The line memory 21 supplies the image signals corresponding to the five lines to a noise suppression circuit 31.

The noise suppression circuit 31 fetches the image signals corresponding to the five lines from the line memory 21 in parallel. The noise suppression circuit 31 is configured to perform sorting processing of image signals in order of magnitude, average value calculation processing, and difference value calculation processing and to have a judgment circuit and a substitution circuit. The judgment circuit judges a magnitude of each image signal with respect to a threshold level (noise threshold value) LevN from a level holding circuit 41, and controls the substitution circuit in accordance with a result of this judgment. The substitution circuit substitutes the image signal in accordance with a result from the judgment circuit, and suppresses, e.g., random noise of the imaging system contained in the image signals corresponding to the five lines.

A signal processing circuit 51 performs known signal processing (e.g., white balance processing, color separation and interpolation processing, outline emphasis processing, and gamma [γ] correction processing) with respect to an output from the noise suppression circuit 31. Further, an RGB matrix circuit generates YUV signals or RGB signals to be output to the outside through output terminals DOUT0 to DOUT7.

A system timing generation circuit (SG) 61 controls the sensor section 11, the line memory 21, the noise suppression circuit 31, and the signal processing circuit 51 in accordance with a clock signal (MCK) from the outside and/or a command from a command control circuit 71.

The command control circuit 71 generates a command associated with data (DATA) supplied from the outside via a serial interface 81 to control parameters and others of the line memory 21, the noise suppression circuit 31, the level holding circuit 41, the signal processing circuit 51, and the SG 61.

Figure 2:
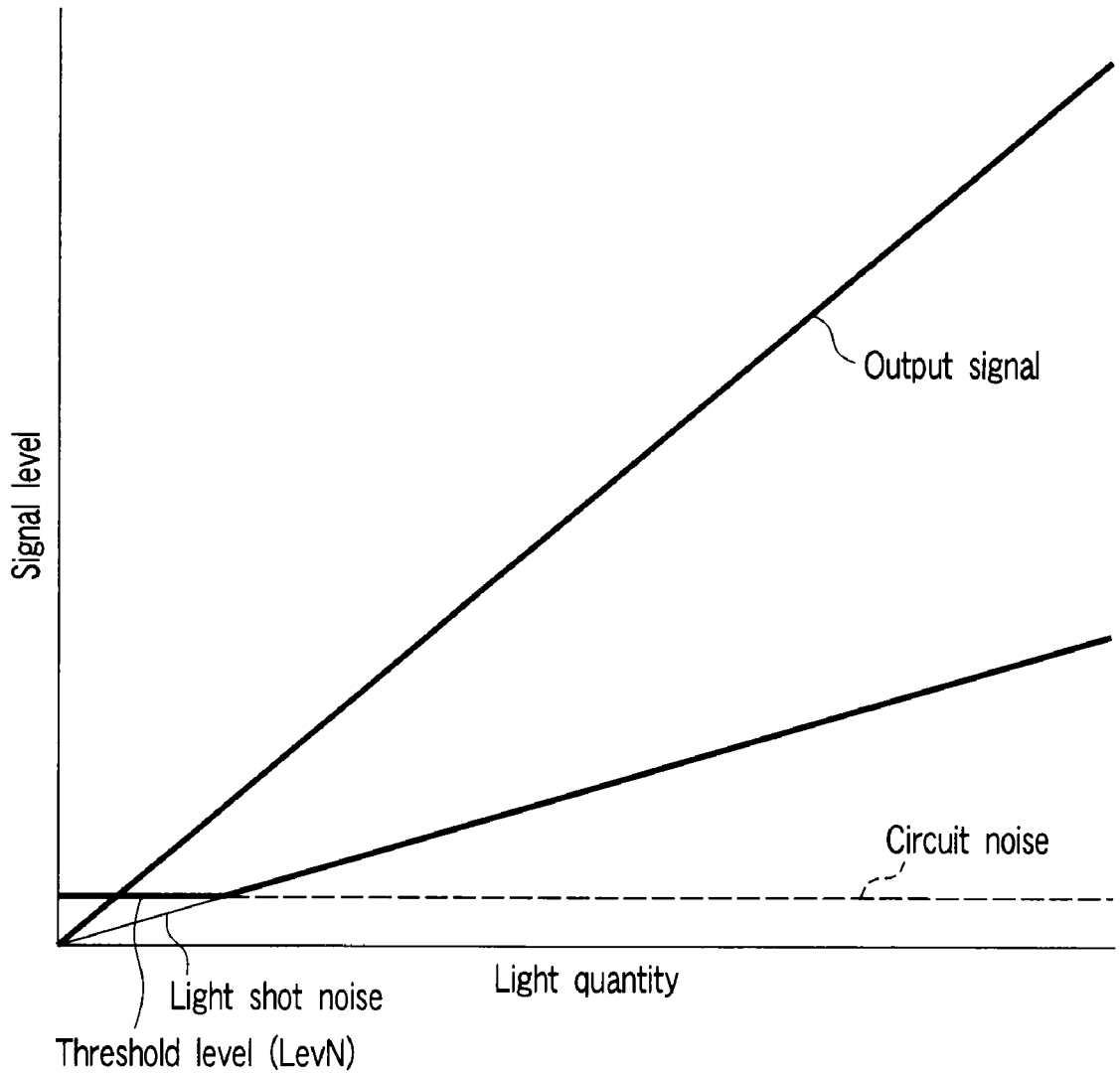
FIG. 2 is a view showing photoelectric conversion characteristics of a sensor section in the CMOS image sensor depicted in FIG. 1.

FIG. 2 shows photoelectric conversion characteristics of the sensor section 11. When a light quantity rises, an output signal from the sensor section 11 is increased. When an increase in a signal level of the output signal, light shot noise is also increased. In general, the light shot noise is produced based on a square root of a light quantity. Furthermore, when the light quantity is low, circuit noise becomes dominant over the light shot noise. Thus, the threshold level LevN assuming level noise is controlled to be a value assuming the circuit noise when the light quantity is low, and controlled to be increased in accordance with the light shot noise when the light quantity is high. Controlling in this manner enables realizing effective random noise suppression.

On the other hand, a luminance signal is generated from a ratio of Y=0.59G+0.3R+0.11B. Thus, at the time of noise suppression processing with respect to an R signal and a B signal having a small effect contributing to the luminance signal Y, the threshold level LevN is set to be higher than that at the time of noise suppression processing with respect to a G signal. Then, an effect of the luminance signal Y for suppressing random noise of the R signal and the B signal can be increased. In particular, when a gain ratio of white balance is set in accordance with each signal amount of RGB, the higher effect can be obtained.

Moreover, when correcting shading due to optical characteristics of a lens 10, signals of pixels close to upper and lower ends, right and left ends, and corner portions with respect to the center of a screen are usually amplified by using a digital gain. Therefore, random noise is increased at the upper and lower ends, the right and left ends, and the corner portions. Thus, when the threshold level LevN is controlled to become higher at the upper and lower ends, the right and left ends, and the corner portions of the screen in accordance with this digital gain, a noise suppression effect is increased, thereby improving an image quality.

Changing the threshold level LevN in many ways in accordance with, e.g., a signal amount, a screen position, color information, gain information, and others in this manner enables further increasing the image quality.

Figure 3:
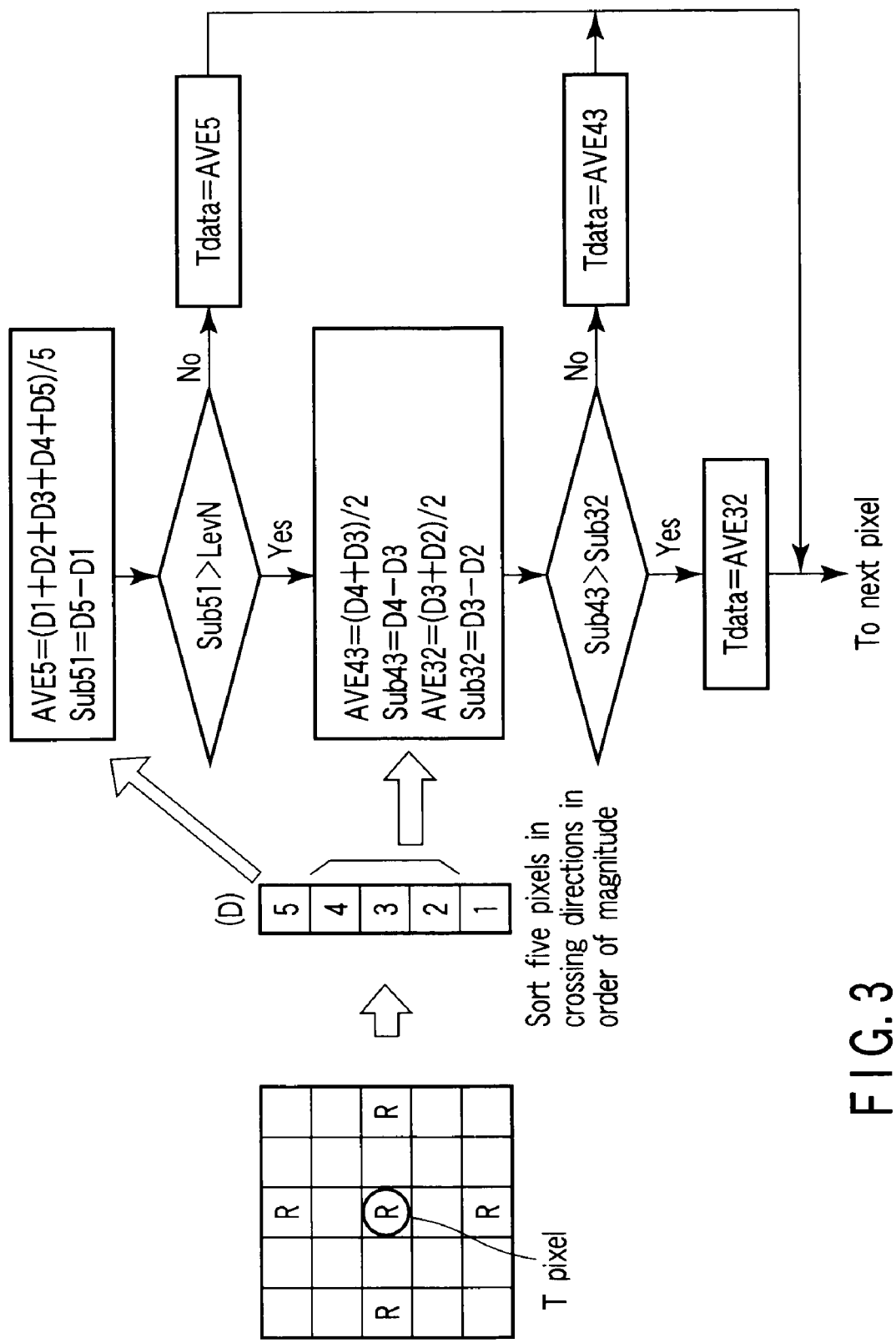
FIG. 3 is a view for explaining an operation of a noise suppression circuit in the CMOS image sensor depicted in FIG. 1.
Figure 4A:
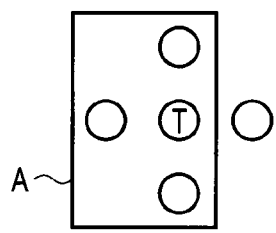
FIGS. 4A to 4I are views for explaining a corrective effect of the CMOS image sensor depicted in FIG. 1.
Figure 4D:
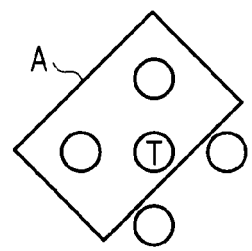
Figure 4G:
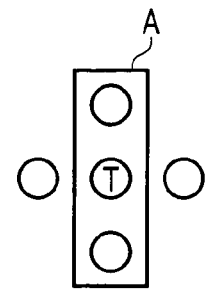
Figure 4B:
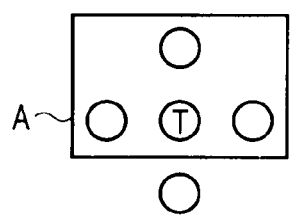
Figure 4E:
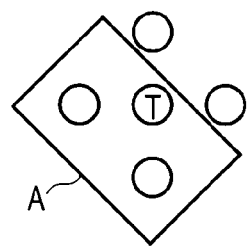
Figure 4H:
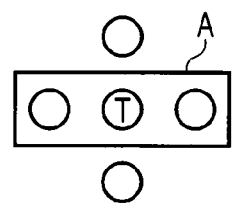
Figure 4C:
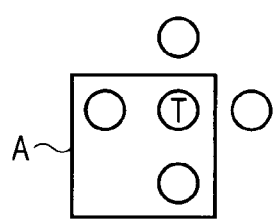
Figure 4F:
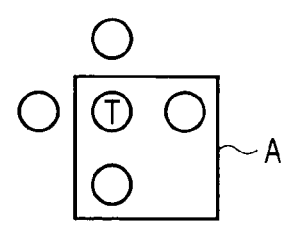
Figure 4I:
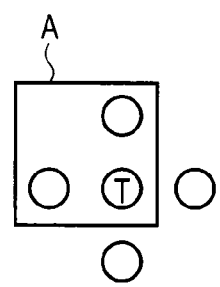

FIG. 3 is a view for explaining an operation of the noise suppression circuit 31 in the imaging apparatus having the structure depicted in FIG. 1. Here, an explanation will be given on an example where a noise suppression target pixel (central pixel) is determined as a T pixel and signals of a total of five pixels including this T pixel and upper, lower, right and left four pixels (peripheral pixels) having the same color which are close to the T pixel in crossing directions of the T pixel are targets of processing.

First, of image signals corresponding to five lines from the line memory 21, signals of five pixels corresponding to the T pixel and the peripheral pixels which are close to the T pixel in the crossing directions of the T pixel and have the same color are sorted in order of level magnitude (D5 to D1). In this case, D5 has a maximum value, D1 has a minimum value, and D2 to D4 have intermediate values. In particular, D3 has a median.

Then, an average value AVE5 of the signal levels D5 to D1 corresponding to the five pixels and a difference value Sub51 between the maximum value D5 and the minimum value D1 are calculated.

Subsequently, a magnitude relationship between the difference value Sub51 and the threshold level LevN assuming a noise level is judged. If the difference value Sub51 is smaller than the threshold level LevN, it is determined that the signals levels D5 to D1 of all the five pixels are equal to or below the noise level, and the average value AVE5 is set to a value (substitution value) Tdata of the T pixel in order to suppress noise. Conversely, if the difference value Sub51 is larger than the threshold level LevN, this is determined as a defect or an edge portion of an image where the signal varies.

Here, the maximum value D5 may possibly correspond to a white defect, and the minimum value D1 may possibly correspond to a black defect. Thus, the signal levels of two pixels each having a small change (level difference) are extracted from the three signals levels D4, D3, and D2 as the intermediate values excluding the maximum value D5 and the minimum value D1 in order to prevent the maximum value D5 having the possibility as the white defect and the minimum value D1 having the possibility as the black defect from contributing to the substitution value Tdata. That is, as an average value of the two pixels each having a large signal level, an average value AVE43 of the signal level D4 and the signal level D3 is calculated. Additionally, a difference value Sub43 between the signal level D4 and the signal level D3 is calculated. Likewise, as an average value of the two pixels each having a small signal level, an average value AVE32 of the signal level D3 and the signal level D2 is calculated. Further, a difference value Sub32 between the signal level D3 and the signal level D2 is calculated.

Then, a magnitude relationship between the difference value Sub43 and the difference value Sub32 is judged. If the difference value Sub43 is smaller than the difference value Sub32, the average value AVE43 is set to the substitution value Tdata.

Conversely, if the difference value Sub32 is smaller than the difference value Sub43, the average value AVE32 is set to the substitution value Tdata.

The above-explained processing is sequentially performed with respect to all pixels, i.e., an R pixel, a Gr pixel, a B pixel, and a Gb pixel, thereby realizing both suppression of the white defect and the black defect and suppression of the random noise. In particular, using the average signal of two pixels (AVE32 or AVE43) even at an edge portion of an image enables reducing the random noise.

It is to be noted that the magnitude relationship of the difference values is judged after calculating the average value and the difference value. However, the average value may be calculated after calculation of the difference value/judgment processing. This can be likewise applied to the following embodiments.

FIGS. 4A to 4I are views for explaining a corrective effect of the imaging apparatus according to the first embodiment. Each of FIGS. 4A to 4I shows an edge portion of a pixel where the corrective effect can be particularly expected as an example.

As shown in each of FIGS. 4A to 4I, in a case where five pixels having the same color in crossing directions (indicated by O in the drawing) are processing targets, if an edge portion of an image includes a T pixel, the number of peripheral pixels having signal levels equal to that of the T pixel is larger the number of peripheral pixels having different signal levels. That is, even if two pixels are excluded at a maximum or one pixel is excluded at a minimum, at least two effective peripheral pixels, i.e., two or more peripheral pixels having signals levels equal to that of the T pixel are present in each frame A. Therefore, averaging signal levels of at least two pixels present in the frame A enables correctly interpolating (substituting) the signal level of the T pixel by using the average value of the signal levels of the effective peripheral pixels. As a result, random noise can be reduced even at the edge portion of the image.

It is to be noted that, when the T pixel is placed at a corner portion of a screen, the signal level of the T pixel often takes a value close to an intermediate level of a large signal and a small signal. At this time, when the signal level of the T pixel is close to the signal level of the large signal, the substitution value Tdata is peaked to the large signal based on averaging of two pixels. Furthermore, when the signal level of the T pixel is close to the signal level of the smaller signal, the substitution value Tdata is peaked to the small signal based on averaging of two pixels. As a result, a peaking effect of providing a sharply-defined edge portion of an image can be obtained.

As explained above, performing the magnitude sorting processing according to the signal levels of the five pixels having the same color which are close to the T pixel in the crossing directions with the target pixel at the center and the averaging and substitution processing of the signal of the target pixel enables providing the high-sensitivity imaging apparatus which has less degradation in a resolution and can suppress the random noise and an influence of a defect. That is, both the sorting processing with respect to the signals levels of the five pixels in the crossing directions based on the magnitudes and the averaging and substitution processing of interpolating the signal level of the target pixel with the average value of the signals levels of the two effective peripheral pixels are carried out. As a result, random noise suppression and defect correction can be simultaneously performed. In particular, the random noise can be effectively suppressed even at the edge portion of the image. Furthermore, the resolution is less degraded, and an effect of emphasizing the edge portion can be obtained as well depending on an imaging scene. Moreover, a circuit scale can be reduced by the processing targeting the five pixels having the same color in the cross pattern.

In this embodiment, since the signals of the five pixels having the same color which are close to each other in the crossing pattern are used, the higher effect can be obtained as compared with an example where a pixel region having a size of 3×3 in vertical and horizontal directions is a processing target.

It is needless to say that the random noise can be further reduced by increasing the number of the peripheral pixels which are processing targets having the same color as the target pixel.

Second Embodiment

Figure 5:
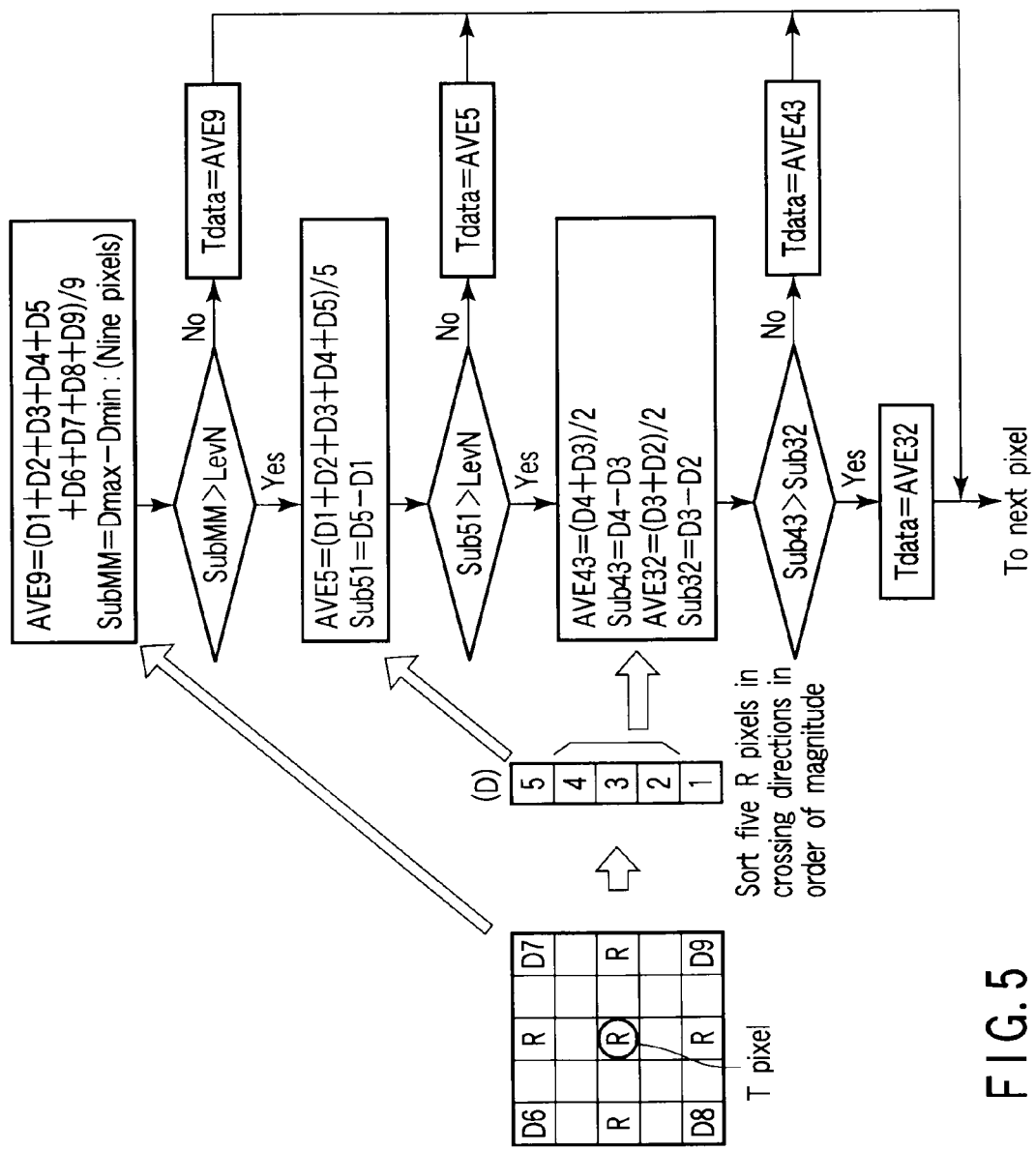
FIG. 5 is a view for explaining an operation of a noise suppression circuit according to a second embodiment of the present invention.

FIG. 5 is a view for explaining an operation of a noise suppression circuit according to a second embodiment of the present invention. An example where an effect of suppressing random noise with respect to a flat portion excluding an edge portion of an image is improved will be explained in this embodiment.

First, before the processing described in the first embodiment, an average value AVE9 of signal levels (D9 to D1) of nine pixels including a T pixel and peripheral pixels having the same color which are close to the T pixel in crossing directions and X-shaped (oblique) directions of the T pixel is calculated. Further, a maximum value Dmax and a minimum value Dmin of the signal levels of the nine pixels are calculated, and a difference value SubMM between these values is also calculated.

Then, a magnitude relationship between this difference value SubMM and a threshold level LevN assuming a noise level is judged. If the difference value SubMM is smaller than the threshold level LevN, it is determined that the signals levels D9 to D1 of all the nine pixels are equal to or below the noise level, and the average value AVE9 is set to a value (substitution value) Tdata of the T pixel.

Conversely, if the difference value SubMM is larger than the threshold level LevN, the same processing (see FIG. 3) as that explained in the first embodiment is carried out at a subsequent step. That is, signals of five pixels corresponding to the T pixel and the peripheral pixels having the same color which are close to the T pixel in the crossing directions of the T pixel are sorted in order of level magnitude (D5 to D1).

Then, an average value AVE5 of the signals levels D5 to D1 of the five pixels and a difference value Sub51 between a maximum value D5 and a minimum value D5 of these signal levels are calculated.

Subsequently, a magnitude relationship between this difference value Sub51 and the threshold level LevN assuming the noise level is judged. If the difference value Sub51 is smaller than the threshold level LevN, it is determined that the signal levels D5 to D1 of all the five pixels are equal to or smaller than the noise level, and the average value AVE5 is set to the threshold value Tdata in order to suppress noise.

Conversely, if the difference value Sub51 is larger than the threshold level LevN, signal levels of two pixels having a small level difference are extracted from the three signal levels D4, D3, and D2 indicating intermediate values excluding the maximum value D5 and the minimum value D1. That is, an average value AVE43 of the signal level D4 and the signal level D3 is calculated as an average value of the two pixels having the large signal levels. Furthermore, a difference value Sub43 between the signal level D4 and the signal level D3 is calculated. Likewise, an average value AVE32 of the signal level D3 and the signal level D2 is calculated as an average value of the two pixels having the small signal levels. Moreover, a difference value Sub32 of the signal level D3 and the signal level D2 is calculated.

Then, a magnitude relationship between the difference value Sub43 and the difference value Sub32 is judged. If the difference value Sub43 is smaller than the difference value Sub32, the average value AVE43 is set to the substitution value Tdata. Conversely, if the difference value Sub32 is smaller than the difference value Sub43, the average value AVE32 is set to the substitution value Tdata.

The above-explained processing is sequentially carried out with respect to all pixels, i.e., an R pixel, a Gr pixel, a B pixel, and a Gb pixel. In this example, since the signal of the T pixel is interpolated by using the average signal of the nine pixels (AVE9) in a flat portion of an image, random noise can be further approximately 3 dB suppressed.

Third Embodiment

Figure 6:
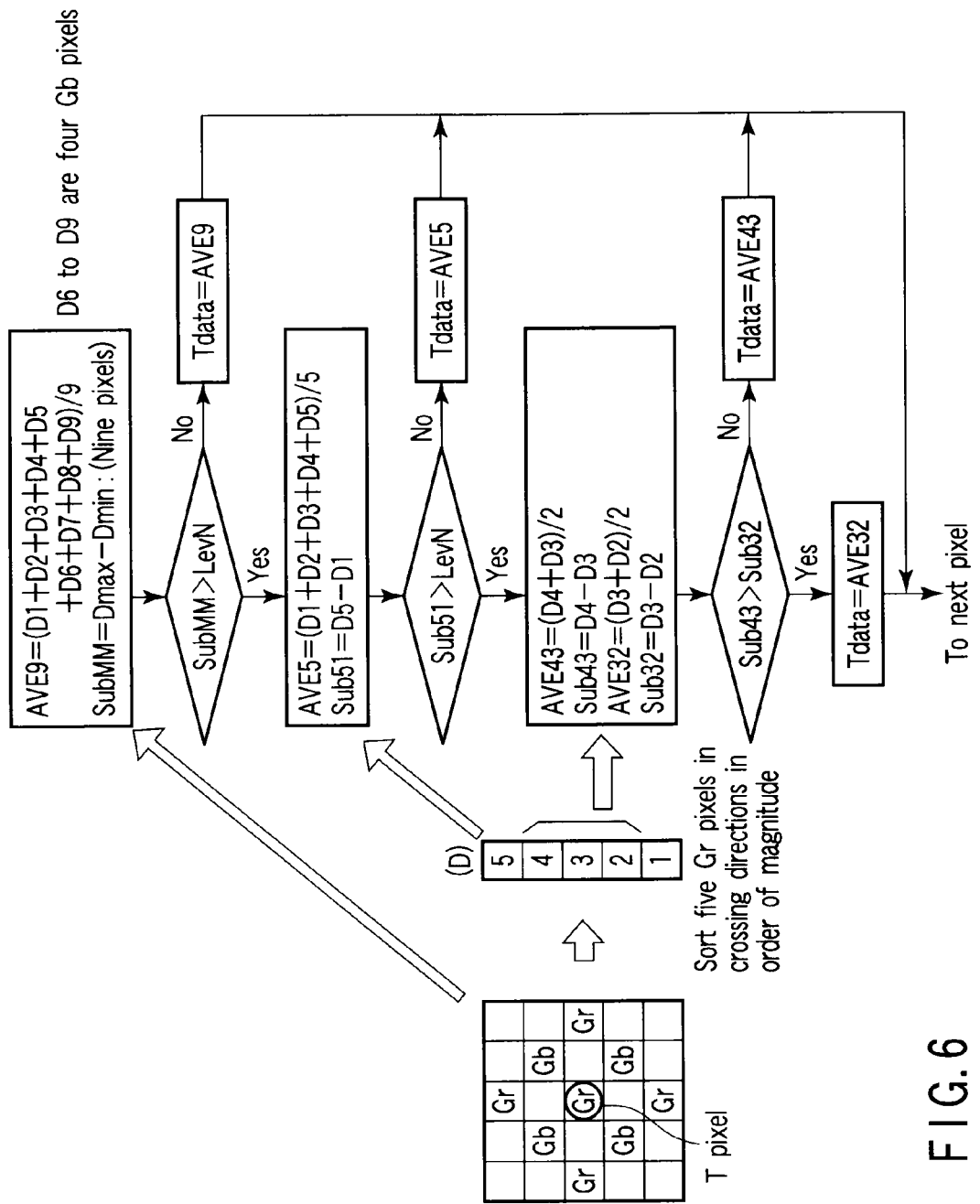
FIG. 6 is a view for explaining an operation of a noise suppression circuit according to a third embodiment of the present invention.

FIG. 6 is a view for explaining an operation of a noise suppression circuit according to a third embodiment of the present invention. In this embodiment, an explanation will be given as to an example where the method of processing Gr and Gb pixels in the second embodiment is changed.

In the processing of the Gr pixel, an average value AVE9 of signal levels (D5 to D1) of five pixels including a T pixel (Gr) and peripheral Gr pixels which are close to the T pixel in crossing directions of the T pixel and signal levels (D9 to D6) of four peripheral Gb pixels which are adjacent to the T pixel in X-shaped directions of the T pixel is calculated. When interpolating the signal of the T pixel by using this average value AVE9, a line sensitivity difference between a Gr line and a Gb line which is distinctive in a flat portion of an image can be reduced.

Likewise, when the T pixel is Gb, it is good enough to calculate an average value AVE9 of signal levels of nine pixels by using signals of five pixels including the T pixel and peripheral Gb pixels which are close to the T pixel in crossing directions of the T pixel and signals of four peripheral Gr pixels which are adjacent to the T pixel in X-shaped directions of the T pixel.

Fourth Embodiment

Figure 7:
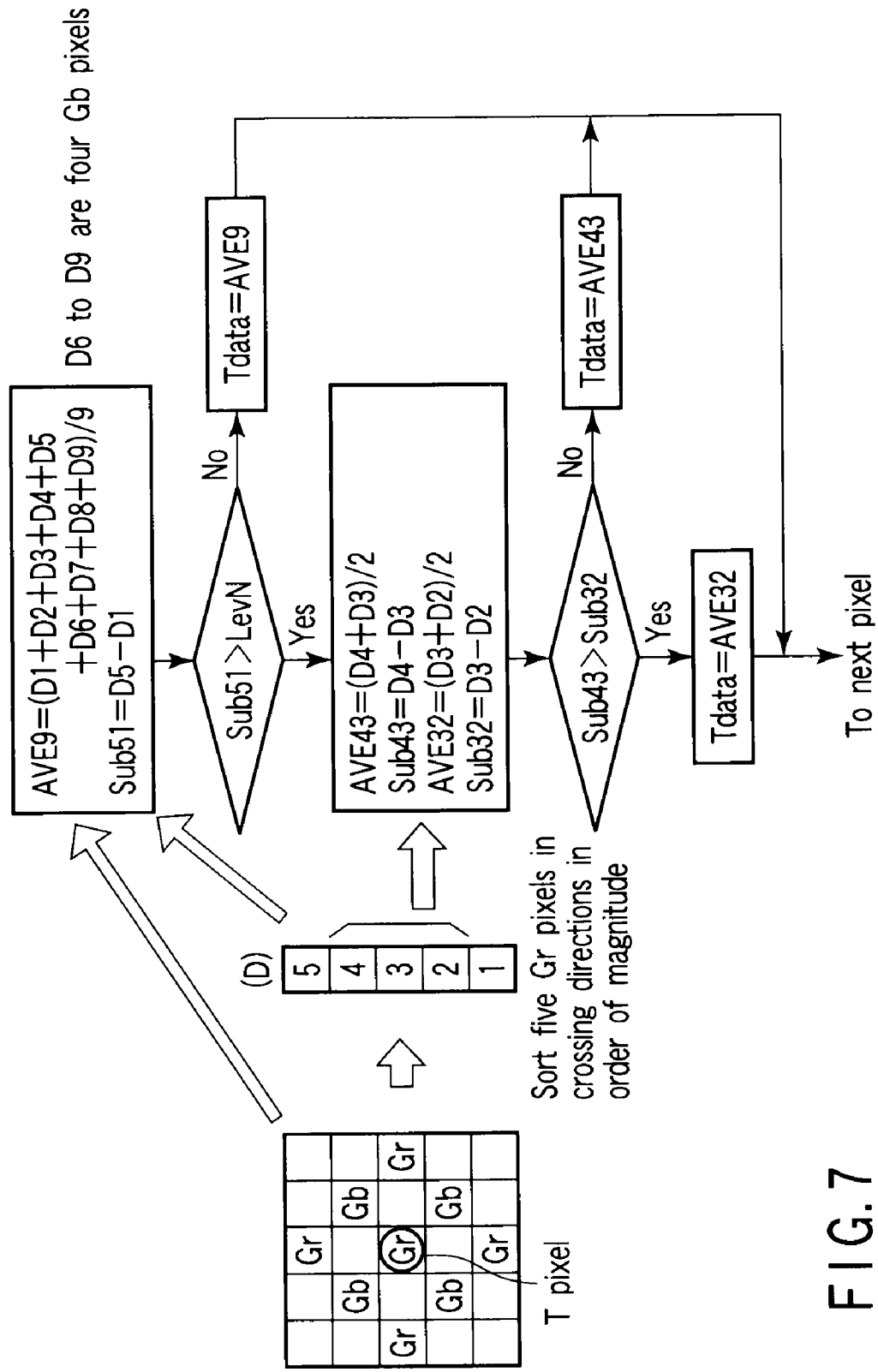
FIG. 7 is a view for explaining an operation of a noise suppression circuit according to a fourth embodiment of the present invention.

FIG. 7 is a view for explaining an operation of a noise suppression circuit according to a fourth embodiment of the present invention. In this embodiment, an explanation will be given as to an example where the processing method described in the third embodiment is simplified.

In this embodiment, four peripheral Gb pixels which are adjacent to a T pixel in X-shaped directions of the T pixel (Gr) are arranged in an area corresponding to five pixels in crossing directions (pixel region having a size of 5×5 in vertical and horizontal directions). Thus, signals of five pixels corresponding to the T pixel and peripheral Gr pixels which are close to the T pixel in crossing directions of the T pixel are first sorted in order of level magnitude (D5 to D1).

Then, an average value AVE9 of signal levels (D5 to D1) of the five Gr pixels and signals levels (D9 to D6) of the four peripheral Gb pixels which are adjacent to the T pixel in the X-shaped directions of the T pixel is calculated. Moreover, a difference value Sub51 of a maximum value D5 and a minimum value D1 of the signal levels of the five Gr pixels is calculated.

Subsequently, a magnitude relationship between this difference value Sub51 and a threshold level LevN assuming a noise level is judged. If the difference value Sub51 is smaller than the threshold level LevN, it is determined that the signal levels D5 to D1 of all the five pixels are equal to or below the noise level, and the average value AVE9 is set to a value (substitution value) Tdata of the T pixel in order to suppress noise.

Based on such a method, a line sensitivity difference between a Gr line and a Gb line which is distinctive in a flat portion of an image can be likewise reduced, and the processing can be also simplified.

It is to be noted that this can be also applied to an example where the T pixel is Gb although a detailed explanation is omitted.

Fifth Embodiment

Figure 8:
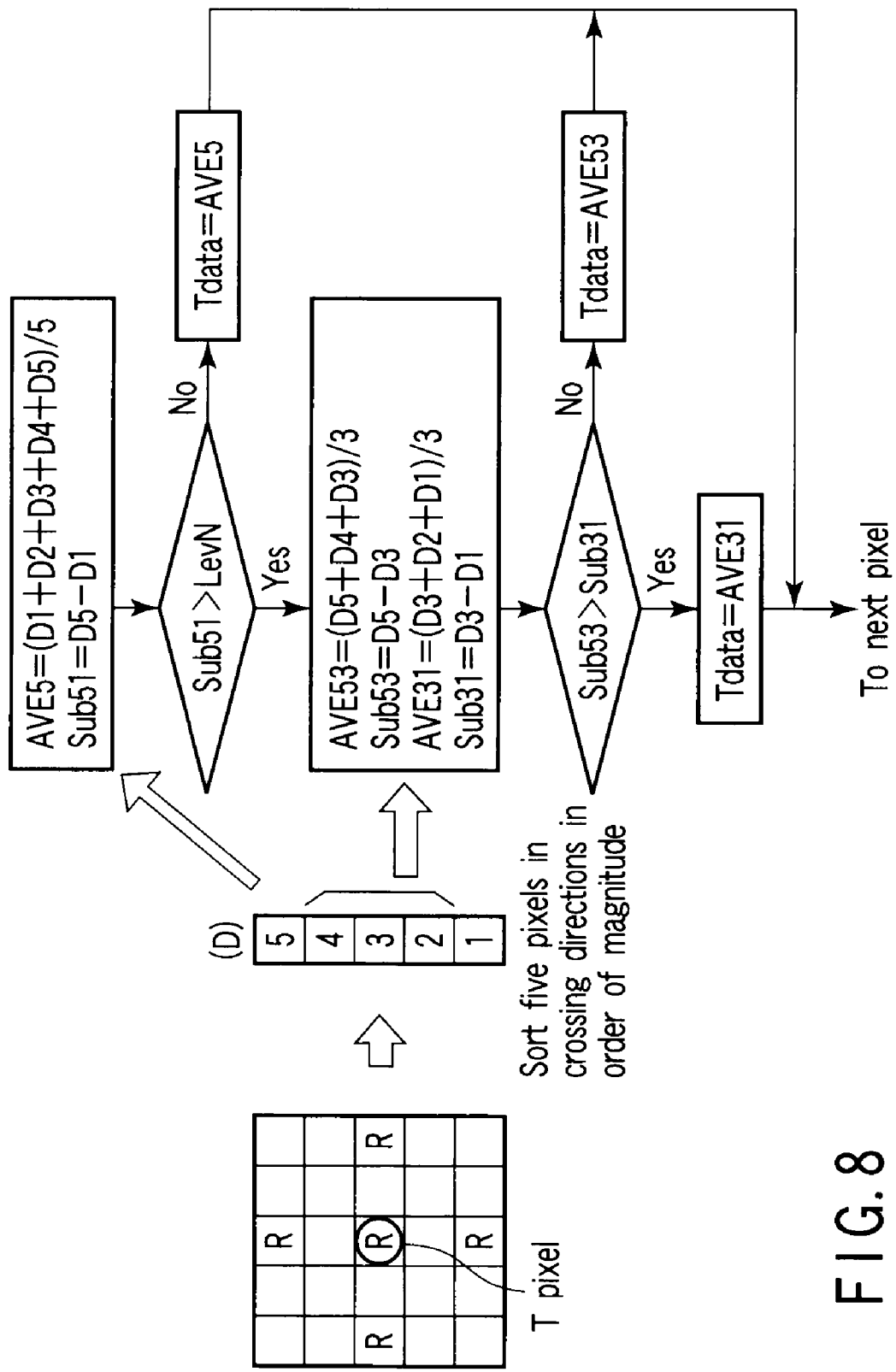
FIG. 8 is a view for explaining an operation of a noise suppression circuit according to a fifth embodiment of the present invention.

FIG. 8 is a view for explaining an operation of a noise suppression circuit according to a fifth embodiment of the present invention. In this embodiment, a description will be given as to an example where processing giving priority to a signal-to-noise ratio rather than edge information is carried out when the signal-to-noise ratio obtained by, e.g., a low illuminance should be improved. That is, this is an example where a signal of a T pixel in an edge portion of an image is substituted by an average value of three pixels.

First, of image signals corresponding to five lines from a line memory 21, a noise suppression target pixel is determined as a T pixel, and signals of five pixels corresponding to this T pixel and peripheral pixels having the same color which are close to the T pixel in crossing directions of the T pixel are sorted in order of level magnitude (D5 to D1).

Then, an average value AVE5 of signals levels D5 to D1 of the five pixels and a difference value Sub51 between a maximum value D5 and a minimum value D1 are calculated.

Subsequently, a magnitude relationship between this difference value Sub51 and a threshold level LevN assuming a noise level is judged. If the difference value Sub51 is smaller than the threshold level LevN, it is determined that the signal levels D5 to D1 of all the five pixels are equal to or lower than the noise level, and the average value AVE5 is set to a value (substitution value) Tdata of the T pixel in order to suppress noise. Conversely, if the difference value Sub51 is larger than the threshold level LevN, this is determined as a defect or an edge portion of an image where a signal varies.

For example, it is assumed that one of the five pixels has a white defect or a black defect. In this case, an average value of the three signal levels D5, D4, and D3 including the maximum value D5 is AVE53, and a difference value (D5–D3) Sub53 is calculated. Likewise, an average value of the three signal levels including the minimum value D1 is AVE31, and a difference value (D3–D1) Sub31 is calculated.

Then, a magnitude relationship between the difference value Sub53 and the difference value Sub31 is judged. If the difference value Sub53 is smaller than the difference value Sub31, the average value AVE53 is set to the substitution value Tdata. Conversely, if the difference value Sub31 is smaller than the difference value Sub53, the average value AVE31 is set to the substitution value Tdata.

Sequentially carrying out the above-explained processing with respect to all pixels, i.e., an R pixel, a Gr pixel, a B pixel, and a Gb pixel, enables realizing suppression of the white defect and the black defect and suppression of random noise. In particular, using the average signal of the three pixels (AVE53 or AVE31) enables further reducing the random noise even in the edge portion of the image.

Sixth Embodiment

Figure 9:
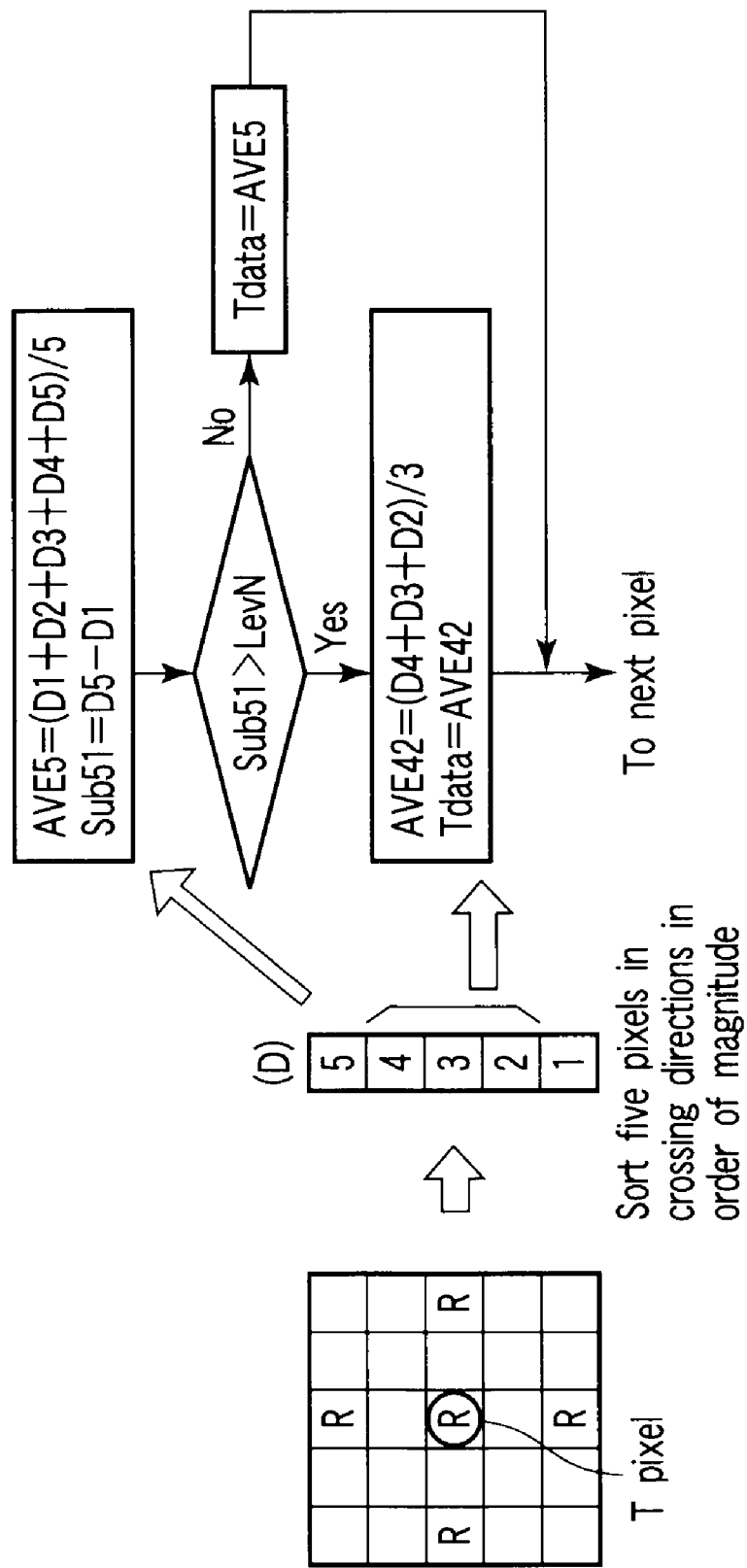
FIG. 9 is a view for explaining an operation of a noise suppression circuit according to a sixth embodiment of the present invention.

FIG. 9 is a view for explaining an operation of a noise suppression circuit according to a sixth embodiment of the present invention. In this embodiment, a description will be given as to an example where the processing method explained in the fifth embodiment is simplified.

In this embodiment, if a difference value Sub51 is larger than a threshold level LevN, an average value AVE42 of three signal levels D4, D3, and D2 as intermediate values excluding a maximum value D5 and a minimum value D1 is calculated, and this average value AVE42 is set to a substitution value Tdata.

According to this method, using the average signal of the three pixels (AVE42) likewise enables further reducing random noise even in an edge portion of an image and simplifying the processing.

It is to be noted that, in each of the foregoing embodiments, the explanation has been given on the example where a color filter arrangement of color filters is a Bayer (tetragonal) arrangement (see FIG. 10A) and five pixels, i.e., a target pixel and pixels having the same color which are close to the target pixel in crossing directions, i.e., upper, lower, right, and left directions of the target pixel are processing targets (see FIG. 10B). The present invention is not restricted thereto, and it can be likewise carried out in a case where five pixels, i.e., a target pixel and pixels having the same color which are close to the target pixel in oblique X-shaped directions of the target pixel are processing targets.

Further, the color filter arrangement of the color filters is not restricted to the Bayer arrangement, and the present invention can be likewise applied to an inclined arrangement (which is also called a honeycomb arrangement) in which each of RGB pixels has an angle of 45 degrees as shown in FIG. 11A, for example. In case of the honeycomb arrangement, five pixels, i.e., a target pixel and pixels having the same color which are close to the target pixel in crossing directions, i.e., upper, lower, right, and left directions of the target pixel can be processing targets (see FIG. 11), or five pixels, i.e., a target pixel and pixels having the same color which are close to the target pixel in oblique X-shaped directions of the target pixel can be processing targets (see FIG. 11C).

Furthermore, even if a black-and-white sensor, a sensor of a color filter arrangement other than the Bayer arrangement or the honeycomb arrangement of the color filters, or pixel shifted arrangement where a pixel is shifted by a half pixel between vertical lines or horizontal lines is adopted, the present invention can be applied as long as this sensor utilizes signals of five pixels having the same color which are arranged in crossing directions (or X-shaped directions). For example, even in case of an WRGB arrangement where a G signal in the Bayer arrangement serves as a W signal (white: including all RGB signals), the present invention can be applied to crossing five pixels of the same color.

Moreover, the present invention is not restricted to the CMOS image sensor, and it can be likewise applied to, e.g., a charge-coupled device (CCD) or a laminated sensor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus in which a noise suppression circuit performs predetermined signal processing with respect to image signals output from an imaging section where a plurality of pixels formed of photoelectric conversion elements are two-dimensionally arranged and a color filter arrangement has a cross of five pixels of a same color,
   wherein the noise suppression circuit includes:
   sorting processing of sorting one signal of a central pixel as a target and four signals of peripheral pixels having the same color which are close to the central pixel in the image signals in order of magnitude;
   average value calculation processing of calculating a first average value from the one signal of the central pixel and the four signals of the peripheral pixels;
   difference value calculation processing of calculating a first difference value from a maximum value and a minimum value of the one signal of the central pixel and the four signals of the peripheral pixels sorted in order of magnitude;
   comparison processing of comparing the first difference value with an assumed noise level; and
   substitution processing of substituting the one signal of the central pixel by an average value of two or more pixel values excluding at least the maximum value or the minimum value when the first difference value is larger than the noise level, and wherein the noise suppression circuit calculates a second average value and a second difference value from two signals having large levels in three signals indicating intermediate values excluding the maximum value and the minimum value, calculates a third average value and a third difference value from two signals having small levels in the same, judges a magnitude relationship between the second difference value and the third difference value, substitutes the one signal of the central pixel by the second average value if the second difference value is smaller than the third difference value, and substitutes the one signal of the central pixel by the third average value if the third difference value is smaller than the second difference value.

2. The apparatus according to claim 1, wherein the noise suppression circuit substitutes the one signal of the central pixel by the first average value when the first difference value is smaller than the noise level.

3. The apparatus according to claim 1, wherein the peripheral pixels are respectively close to the central pixel in crossing directions thereof.

4. The apparatus according to claim 1, wherein the peripheral pixels are respectively close to the central pixel in X-shaped directions thereof.

5. The apparatus according to claim 1, wherein, when the first difference value is larger than the noise level, the noise suppression circuit further calculates a second average value and a second difference value from three signals having large levels in the five signals including the maximum value and the minimum value, calculates a third average value and a third difference value from three signals having small levels in the same, judges a magnitude relationship between the second difference value and the third difference value, substitutes the one signal of the central pixel by the second average value if the second difference value is smaller than the third difference value, and substitutes the one signal of the central pixel by the third average value if the third difference value is smaller than the second difference value.

6. The apparatus according to claim 1, wherein, when the first difference value is larger than the noise level, the noise suppression circuit further calculates a second average value from three signals indicating intermediate values excluding the maximum value and the minimum value, and substitutes the one signal of the central pixel by the second average value.

7. The apparatus according to claim 1, wherein the noise suppression circuit further calculates a second average value from one signal of a central pixel as a target and eight signals of peripheral pixels having the same color which are adjacent to the central pixel in the image signals, calculates a second difference value from a maximum value and a minimum value of the one signal of the central pixel and the eight signals of the peripheral pixels, and substitutes the one signal of the central pixel by the second average signal if the second difference value is smaller than the noise level.

8. The apparatus according to claim 1, wherein, when the central pixel is Gr or Gb, the noise suppression circuit further calculates a second average value from one signal of a central Gr or Gb pixel as a target, four signals of peripheral Gr or Gb pixels which are respectively close to the central Gr or Gb pixel in crossing directions, and four signals of peripheral Gb or Gr pixels which are respectively close to the central Gr or Gb pixel in X-shaped directions, calculates a second difference value from a maximum value and a minimum value of the one signal of the central Gr or Gb pixel and the eight signals of the peripheral Gr or Gb pixels, and substitutes the one signal of the central Gr or Gb pixel by the second average signal if the second difference value is smaller than the noise level.

9. The apparatus according to claim 1, wherein, when the central pixel is Gr or Gb, the noise suppression circuit further calculates a second average value from one signal of a central Gr or Gb pixel, four signals of peripheral Gr or Gb pixels which are respectively close to the central Gr or Gb pixel in crossing directions, and four signals of peripheral Gb or Gr pixels which are respectively close to the central Gr or Gb pixels in X-shaped directions, and substitutes the one signal of the central Gr or Gb pixel by the second average value if the first difference value is smaller than the noise level.

10. An imaging apparatus comprising: an imaging section in which a plurality of pixels formed of photoelectric conversion elements are two-dimensionally arranged and a color filter arrangement has a cross of five pixels of a same color; and a noise suppression circuit which performs predetermined signal processing with respect to image signals respectively output from the imaging section, wherein the noise suppression circuit includes:

sorting processing of sorting one signal of a central pixel as a target and four signals of peripheral pixels having the same color which are close to the central pixel in crossing directions or X-shaped directions in the image signals in order of magnitude;

difference value calculation processing of calculating a first difference value from a maximum value and a minimum value of the one signal of the central pixel and the four signals of the peripheral pixels sorted in order of magnitude;

average value calculation processing of calculating a first average value from the one signal of the central pixel and the four signals of the peripheral pixels;

comparison processing of comparing the first difference value with an assumed noise level; and substitution processing of substituting the one signal of the central pixel by the first average value when the first difference value is smaller than the noise level;

substitution processing of substituting the one signal of the central pixel by an average value of two or more pixel values excluding at least the maximum value or the minimum value when the first difference value is larger than the noise level, wherein, when the central pixel is Gr or Gb, the noise suppression circuit further calculates a second average value from one signal of a central Gr or Gb pixel as a target, four signals of peripheral Gr or Gb pixels which are respectively close to the central Gr or Gb pixel in crossing directions, and four signals of peripheral Gb or Gr pixels which are respectively close to the central Gr or Gb pixel in X-shaped directions, calculates a second difference value from a maximum value and a minimum value from the one signal of the central Gr or Gb pixel and the eight signals of the peripheral Gr or Gb signals, and substitutes the one signal of the central Gr or Gb pixel by the second average value if the second difference value is smaller than the noise level.

11. The apparatus according to claim 10, wherein, when the first difference value is larger than the noise level, the noise suppression circuit calculates a second average value and a second difference value from two signals having large levels and also calculates a third average value and a third difference value from two signals having small levels in three signals indicating intermediate values excluding the maximum value and the minimum value, substitutes the one signal of the central pixel by the second average value if the second difference value is smaller than the third difference value, and substitutes the one signal of the central pixel by the third average value if the third difference value is smaller than the second difference value.

12. The apparatus according to claim 10, wherein when the first difference value is larger than the noise level, the noise suppression circuit further calculates a second average value and a second difference value from three signals having large levels and also calculates a third average value and a third difference value from three signals having small levels in the five signals including the maximum value and the minimum value, substitutes the one signal of the central pixel by the second average value if the second difference value is smaller than the third difference value, and substitutes the one signal of the central pixel by the third average value if the third difference value is smaller than the second difference value.

13. The apparatus according to claim 10, wherein, when the first difference value is larger than the noise level, the noise suppression circuit further calculates a second average value from three signals indicating intermediate values excluding the minimum value and the minimum value, and substitutes the one signal of the central pixel by the second average value.

14. The apparatus according to claim 10, wherein the noise suppression circuit further calculates a second value from the one signal of the central pixel and eight signals of peripheral pixels having the same color which are close to the central pixel in crossing directions and X-shaped directions, calculates a second difference value from a maximum value and a minimum value of the one signal of the central pixel and the eight signals of the peripheral pixels, and substitutes the one signal of the central pixel by the second average value if the second difference value is smaller than the noise level.

15. The apparatus according to claim 10, when the central pixel is Gr or Gb, the noise suppression circuit further calculates a second average value from one signal of a central Gr or Gb pixel as a target, four signals of peripheral Gr or Gb pixels which are respectively close to the central Gr or Gb pixel in crossing directions, and four signals of peripheral Gb or Gr pixels which are respectively close to the central Gr or Gb pixel in X-shaped direction, and substitutes the one signal of the central Gr or Gb pixel by the second average value if the first difference value is smaller than the noise level.

* * * * *